US007686531B2

(12) United States Patent
Congdon

(10) Patent No.: US 7,686,531 B2
(45) Date of Patent: Mar. 30, 2010

(54) UNIVERSAL ROTATION-INHIBITING CONNECTOR APPARATUS AND METHOD FOR THREADED UTILITY HANDLES

(76) Inventor: Joseph L. Congdon, 1036 Merlin Dr., Niskayuna, NY (US) 12309

( * ) Notice: Subject to any disclaimer, the term of this patent is extended or adjusted under 35 U.S.C. 154(b) by 76 days.

(21) Appl. No.: 11/691,616

(22) Filed: Mar. 27, 2007

(65) Prior Publication Data

US 2007/0166100 A1 Jul. 19, 2007

(51) Int. Cl.
*F16B 7/18* (2006.01)

(52) U.S. Cl. ....................... 403/296; 403/307; 411/258; 411/301; 16/426

(58) Field of Classification Search ................. 403/118, 403/296, 307, 342, 343; 411/258, 301, 161, 411/162, 165; 16/426, 429, 436

See application file for complete search history.

(56) References Cited

U.S. PATENT DOCUMENTS

| | | | | | |
|---|---|---|---|---|---|
| 1,885,761 | A | * | 11/1932 | Peirce, Jr | 411/162 |
| 1,931,649 | A | * | 10/1933 | Eger | 411/161 |
| 2,086,422 | A | | 7/1937 | Klimt | 403/246 |
| 2,179,959 | A | | 11/1939 | Schroedter | 403/224 |
| 2,256,851 | A | * | 9/1941 | Schnorr | 411/162 |
| 2,399,526 | A | * | 4/1946 | Warren, Jr | 411/301 |
| 2,705,336 | A | | 4/1955 | Wilson | 15/145 |
| 2,819,060 | A | | 1/1958 | Neidhart | 267/153 |
| 2,834,625 | A | * | 5/1958 | Stanley et al. | 403/343 |
| 3,061,386 | A | | 10/1962 | Dix et al. | 384/535 |
| 3,142,887 | A | | 8/1964 | Hulck et al. | 29/898.06 |
| 4,286,894 | A | | 9/1981 | Rongley | 403/372 |
| 4,371,282 | A | | 2/1983 | Sturm | 403/277 |
| 4,684,283 | A | | 8/1987 | Lewis, Jr. | 403/299 |
| 4,722,634 | A | | 2/1988 | Malish | 403/299 |
| 4,790,683 | A | | 12/1988 | Cramer, Jr. et al. | 403/372 |
| 4,792,256 | A | | 12/1988 | Batchelor | 403/296 |
| 5,161,278 | A | | 11/1992 | Tomm | 15/159.1 |
| 5,172,447 | A | | 12/1992 | Tomm | 15/159.1 |
| 5,210,898 | A | | 5/1993 | Carey | 15/176.2 |
| 5,322,304 | A | | 6/1994 | Rivin | 279/103 |
| 5,334,101 | A | * | 8/1994 | McDermott | 403/296 |
| 5,366,314 | A | | 11/1994 | Young | 403/299 |
| 5,385,420 | A | | 1/1995 | Newman, Sr. et al. | 403/299 |
| 5,527,224 | A | * | 6/1996 | Costain et al. | 473/44 |
| 5,595,391 | A | | 1/1997 | Rivin | 279/103 |
| 6,219,883 | B1 | | 4/2001 | Keichline | 16/110.1 |
| 6,293,726 | B1 | | 9/2001 | Wolf | 403/299 |
| 6,328,499 | B1 | | 12/2001 | Reding et al. | 403/299 |
| 6,582,317 | B2 | * | 6/2003 | Pechauer et al. | 403/296 |
| 6,761,500 | B2 | | 7/2004 | Young | 403/24 |
| 6,779,955 | B2 | | 8/2004 | Rivin | 409/234 |
| 7,347,791 | B1 | * | 3/2008 | Watkins et al. | 403/296 |

OTHER PUBLICATIONS

Journal of Elastomers and Plastics, Sage Publications, http://jep.sagepub.com/.

* cited by examiner

*Primary Examiner*—Michael P Ferguson
(74) *Attorney, Agent, or Firm*—Jay R. Yablon

(57) ABSTRACT

A universal connector apparatus for securing a male-threaded utility handle end into a female receptacle of a tool assembly comprising a tool, comprising: a substantially-circular friction ring; a substantially-circular thread neck attached at a leading end thereof to, and centrally-aligned with, a trailing end of the friction ring; and a substantially-circular threaded-end aperture running centrally through the friction ring and thread neck combination.

16 Claims, 4 Drawing Sheets

UNIVERSAL ROTATION-INHIBITING CONNECTOR APPARATUS AND METHOD FOR THREADED UTILITY HANDLES

FIELD OF THE INVENTION

This invention relates to connectors, and in particular, to a universal connector to facilitate rapid and secure connection and disconnection of a standard threaded utility handle to a tool (e.g., broom, brush, paint-roller), for substantially inhibiting rotation between the tool and the handle.

BACKGROUND OF THE INVENTION

FIG. 1 illustrates a standard threaded utility handle 1 widely employed in the prior art, including a standard male-threaded handle end 11. Such handles are typically removably attached to a wide range of tools, including but not limited to: car wash brushes, brooms, leaf rakes, paint rollers, light bulb changers, outdoor elevated sign changers, wet mops, pole sanders, dusters, floor squeegees, snow shovels, chimney sweep tools, concrete screeds, window washing squeegees, paint edgers, roof snow removal tools, grass edgers, dust pans, dust mops, snow brushes, landscape rakes and limb saws. FIG. 6, illustrates a paint roller as an example of such a tool 61, and in FIG. 7 and thereafter, the range of tools to which utility handle 1 can be attached is schematically illustrated generally by the "black box" tool 61. Thus, tool 61 is to be understood to represent any one of the range of tools mentioned above, as well as any other tool not specifically mentioned which also may be connected to utility handle 1. As shown, tool 61 includes a female receptacle 62 sized and configured to mate with the male-threaded handle end 11 of utility handle 1. The combination of tool 61 with female receptacle 62 will be referred to herein as a tool assembly 6.

A standard threaded utility handle 1 can vary in its length from a few inches to four or five feet or longer. For example, for changing high-ceiling light bulbs, utility handle 1 may be twelve feet long or more. Referring to FIG. 1, this wide variation in permissible lengths is illustrated by cutout 17. However, the diameters are fairly standard. A standard threaded utility handle 1 typically comprises a handle diameter 12 of approximately ⅞", with an outer thread diameter 13 of approximately ¾" and an inner thread diameter 14 of approximately ½" to ⅝", often approximately 9/16". The fact that handle diameter 12 is larger than both outer thread diameter 13 and inner thread diameter 14 results in utility handle 1 comprising a circumferential "shoulder" 15 proximate the juncture between the primary section 16 of handle 1 and the male-threaded handle end 11, as illustrated. Finally, male-threaded handle end 11 typically comprises a length 18 of about 1".

Part of the problem of using a tool 61 attached to a utility handle 1 by mating the male-threaded handle end 11 with the female receptacle 62 is that the torques which impinge on tool 61 during use cause tool 61 to rotate relative to utility handle 1, which is undesirable. This is especially a problem with "wet" applications such as painting, car washing, etc., because moisture seeps into the juncture where tool 61 mates with utility handle 1, reducing the friction between male-threaded handle end 11 and female receptacle 62, and making this juncture rather slick. Whether or not the juncture is wet, undesirable rotation between male-threaded handle end 11 and female receptacle 62 still occurs because of the coarse thread and repeated uses. These twisting forces (torques) applied to the tool during usage results in un-threading which causes the handle to become loose. Of course, this renders the device functionally ineffective, reducing productivity, damaging surfaces, and leading to frustration by the user.

In an effort to eliminate the loosening problem, the user may screw male-threaded handle end 11 into female receptacle 62 with great force, at times damaging the tool or the handle itself. Tape, nails and/or screws are also frequently used to prevent loosening. However, this may cause damage to the tool or the handle as well. It also slows productivity when attempting to remove the handle for use with another tool, as well as when the handle is first attached to the tool.

Though advances have been made in the construction of these standard handles, such as using different types of wood, plastics and metals, the frequent use and reuse of these handles, in dry and especially wet applications, leads to the inevitable loosening described above.

The prior art does show some attachments between a standard threaded utility handle 1 with male-threaded handle end 11, and a tool 61, but none of which is universal, simple to use, and suitable to mitigate the rotational effects outlined above.

U.S. patents of general background interest include U.S. Pat. No. 2,819,060 which includes elastic cushioning rings for "resilient damping of impacts or for the supporting of loads" (column 1, lines 13-14) and U.S. Pat. No. 5,322,304 for "connecting a tool to a spindle" (abstract), see also, U.S. Pat. Nos. 5,595,391 and 6,779,955. U.S. Pat. No. 2,179,959 is also of interest due to its elastic nature.

U.S. Pat. Nos. 3,061,386; 3,142,887; 4,286,894; and 4,790,683 illustrate various "tolerance rings," which are of general background interest.

U.S. Pat. No. 2,086,422 generally shows a tool handle fastener, but it is not a universal attachment and is not simple to use. U.S. Pat. No. 4,684,283 is a similar adapter, for the end of a threaded broomstick handle. In a similar vein, see also U.S. Pat. Nos. 4,371,282; 4,722,634; 4,792,256; 5,210,898; and 6,293,726. U.S. Pat. Nos. 5,161,278; 5,172,447; and 5,366,314 further contain locking mechanisms, which also add unnecessary complexity. Other coupling devices which are needlessly complex include U.S. Pat. Nos. 5,385,420; 6,219,883; 6,328,499; 6,328,499; and 6,761,500.

It would be desirable to have available a universal connector which can be used to secure a threaded utility handle 1 to a tool 61, which substantially inhibits relative rotation between the handle and the tool as the tool is used, especially for wet application, but also for dry ones.

It is further desirable that this connector be simple in configuration, easy to use, low cost to produce, and universally applicable to the juncture of a standard threaded utility handle 1 with any type of tool 61.

It is further desirable that the attachment and detachment of threaded utility handle 1 with tool 61 be a very simple operation which can take place in a matter of seconds, without any extra tools or parts, other than the connector itself.

While measurements herein are all presented in non-metric units as employed within, for example, the United States, it is to be understood that in places which make use of metric units, each of the pertinent length parameters discussed here in relation to utility handles and the female tool receptacles to which they mate will have a corresponding metric counterpart, and it is understood that these metric counterparts are also included with the scope of this disclosure and its associated claims.

SUMMARY OF THE INVENTION

Disclosed herein is a universal connector apparatus for securing a male-threaded utility handle end into a female receptacle of a tool assembly comprising a tool, comprising:

a substantially-circular friction ring; a substantially-circular thread neck attached at a leading end thereof to, and centrally-aligned with, a trailing end of the friction ring; and a substantially-circular threaded-end aperture running centrally through the friction ring and thread neck combination. The friction ring and thread neck are sized and shaped and comprise a connector material enabling a snug fit over the male threading of the male-threaded handle when an end of the handle proximate the male threads is inserted through the friction ring and thread neck combination. The connector material supplies sufficient friction wherein when the friction ring and thread neck combination is fitted over the male threads, and when the male threads in combination with the thread neck are screwed into the female receptacle of the tool assembly, the connector apparatus substantially impedes relative rotation between the handle and the tool.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) and appendices summarized below.

DETAILED DESCRIPTION

Figure 2:
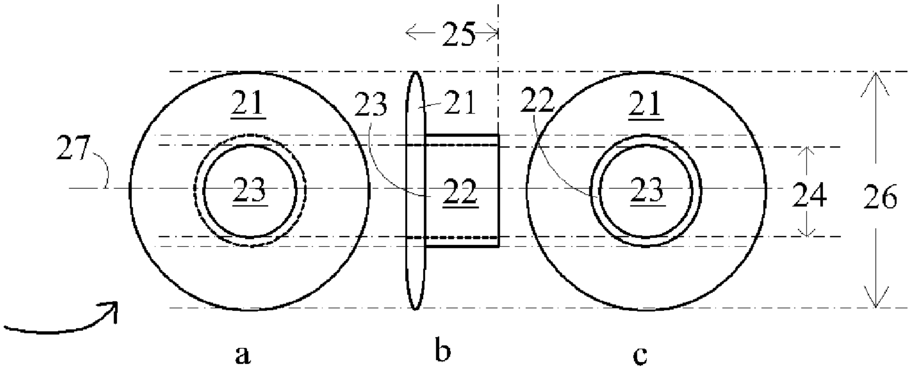
FIG. 2 illustrates a side plan view (b) of a universal connector apparatus in a first preferred embodiment of the invention, projected out to a leading-end plan view (a) and a trailing-end plan view (c). Dashed lines represent lines which are "hidden" from view in a particular view.

FIG. 2 illustrates universal connector apparatus 2 in a first preferred embodiment of the invention, from three views. Referring to side plan view (b), for which the "leading end" is to the left and the "trailing end" is to the right, it can be seen that universal connector apparatus 2 comprises two main components: a friction ring 21 which is substantially-circular comprising opposing contact surfaces and is comparatively wide in the vertical dimension and narrow in the horizontal direction, and a thread neck 22 attached with the friction ring 21, such that the leading end of thread neck 22 is fabricated in integral attachment with the trailing end of friction ring 21, as illustrated. Thread neck 22 is also substantially-circular, and is comparatively narrow in the vertical dimension and wide in the horizontal direction, as illustrated. The centers 27 of friction ring 21 and thread neck 22 are longitudinally-aligned, also as illustrated. Running all the way through universal connector apparatus 2, through both friction ring 21 and thread neck 22, about the line defining the centers 27, and open at both ends, is a threaded-end aperture 23. Dashed line are used to illustrate what is hidden in any given view. Thus, the dashed lines in view (b) illustrate that threaded-end aperture 23 is hidden from this view. The dashed circle in view (a) illustrates that thread neck 22 is hidden from this view. The absence of any dashed line in view (c) illustrates that all of friction ring 21, thread neck 22 and threaded-end aperture 23 can be seen from this view.

Figure 1:
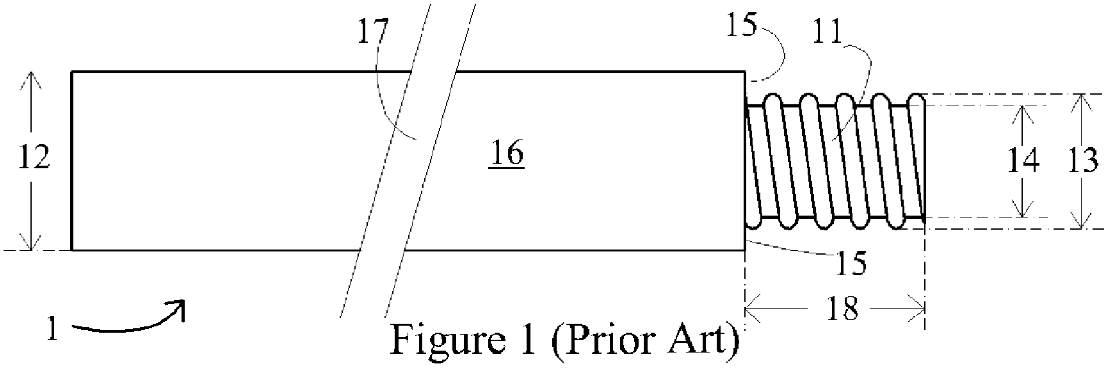
Figure 1 (Prior Art)
FIG. 1 illustrates a standard threaded utility handle as is widely employed in the prior art.
Figure 3:
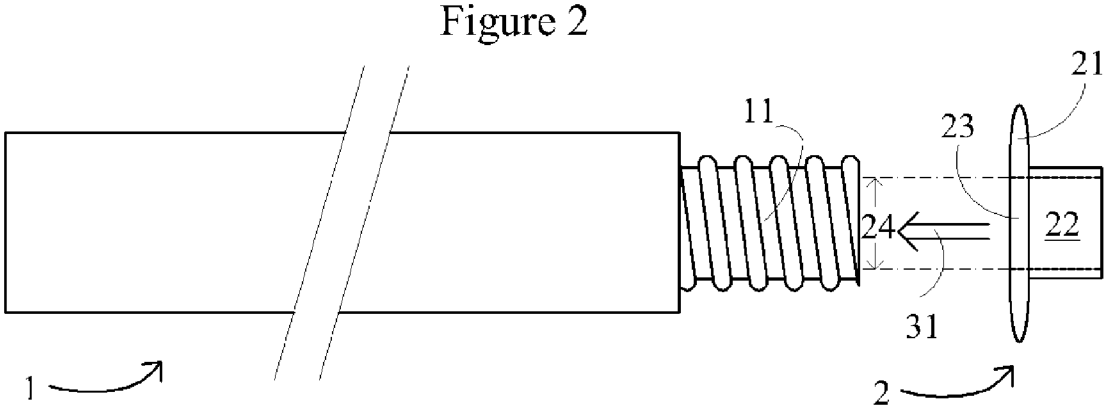
FIG. 3 illustrates a side plan view of the universal connector apparatus of FIG. 2, juxtaposed alongside the threaded utility handle of FIG. 1, prior to the attachment of the universal connector apparatus to the threaded utility handle.
Figure 4:
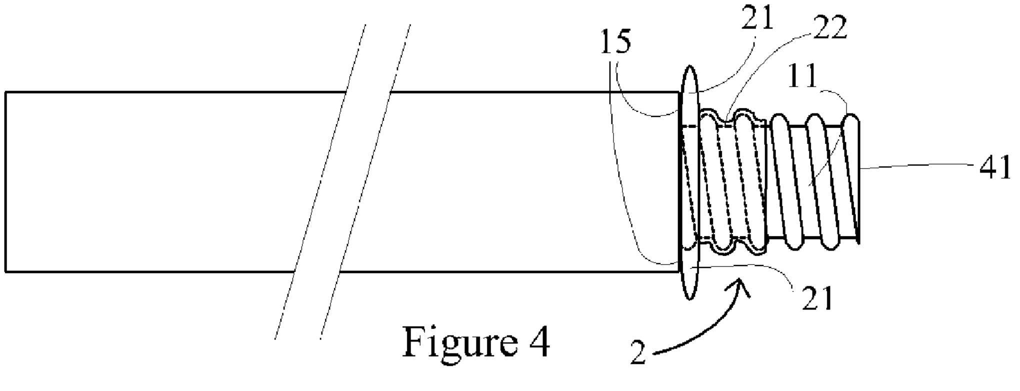
FIG. 4 illustrates in side plan view, the universal connector apparatus of FIG. 2. after it has been snugly fitted over the male-threaded handle end of the threaded utility handle of FIG. 1.

Preferably, universal connector apparatus 2 is fabricated as an integral unitary module; that is, friction ring 21 thread neck 22 are integrally molded together as a unitary module with threaded-end aperture 23 running therethrough. Preferably, universal connector apparatus 2 comprises a connector material which is suitably elastic to as to provide a snug fit when threaded-end aperture 23 is fitted over (31) male-threaded handle end 11, as illustrated in FIGS. 3 and 4. Preferably, the threaded-end aperture 23 of universal connector apparatus 2 comprises an aperture diameter 24 which is approximately equal to or slightly smaller than the width of inner thread diameter 14. This, combined with the elasticity just mentioned, enables universal connector apparatus 2, after fitting 31, to fit snugly over male-threaded handle end 11, and to conform to male-threaded handle end 11, as illustrated in FIG. 4, and as isolated in FIG. 5. Preferably, universal connector apparatus 2 comprises a length 25 which is less than the length 18 of male-threaded handle end 11, contrast FIGS. 1 and 2. Preferably, connector length 25 is between approximately ¼" and ¾", and more preferably, between approximately ⅜" and ⅝", and most preferably, approximately ½"; that is, about half the length 18 of male-threaded handle end 11. Thus, when universal connector apparatus 2 is fitted over male-threaded handle end 11 as in FIG. 4, about half of male-threaded handle end 11 is still exposed without being enveloped by universal connector apparatus 2.

Figure 7:
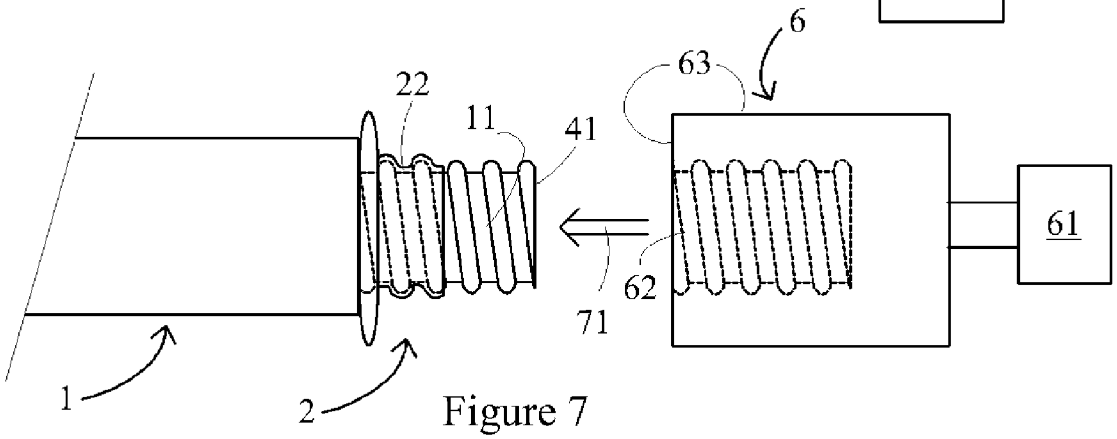
FIG. 7 is a side plan view illustrating the tool assembly of FIG. 6, generalized to any suitable tool, being fitted over the combination of the universal connector apparatus and the male-threaded handle end shown in FIG. 4.

Preferably, connector apparatus 2 comprises a connector material which also provides suitable friction so that once it is fitted over male-threaded handle end 11 as in FIG. 4, rotation of universal connector apparatus 2 relative to male-threaded handle end 11 is substantially inhibited. Similarly, this connector material used to fabricate connector apparatus 2 also provides suitable friction once female threads inside female receptacle 62 of tool assembly 6 are further fitted (71) over the combination of universal connector apparatus 2 and male-threaded handle end 11, as shown before this fitting 71 in FIG. 7, and after this fitting is completed in FIG. 8. In particular, connector apparatus 2 preferably comprises a connector material for which the friction is substantially maintained (and preferably is increased) even when the connector material becomes wetted with either water soluble or water insoluble fluids, so that relative rotation of universal connector apparatus 2 and male-threaded handle end 11 is impeded even when the juncture is wet. Indeed, fabrication from any material which gains friction by, for example, becoming tacky when wetted, is ideal for wet applications.

Preferably, the outer diameter 26 of friction ring 21 is slightly larger than the approximately ⅞" handle diameter 12, as can be seen in FIGS. 3, 4, 7 and 8, and is preferably between ⅞" and 1¼", and most preferably approximately 1". This is for two reasons: first, this extra diameter over handle diameter 12 provides universal connector apparatus 2 with a region which can be gripped firmly by a user (e.g., between thumb and forefinger) when the user is fitting (31) the universal connector apparatus 2 over male-threaded handle end 11 as in the method of going from the FIG. 3 to FIG. 4 configuration, or when universal connector apparatus 2 is being removed from male-threaded handle end 11 during disassembly after use. Second, because the outside surface 63 of a female receptacle 62 typically (though not always) has a wider diameter than the approximately ⅞" handle diameter 12 (see FIGS. 7 and 8 for the best contrast of these diameters), this creates a larger frictional surface at 81, between friction ring 21 and the outside surface 63 of female receptacle 62. However, this is not required, and in some situations, is not desired. For example, there are some female receptacles 62, configured as in FIG. 9, where the unthreaded end of utility handle 1 proximate male-threaded handle end 11 is also inserted into female receptacle 62, occupying the approximately ⅞" diameter region designated as 91. In this circumstance, the outer diameter 26 of friction ring 21 needs to be approximately equal to the ⅞" handle diameter 12, otherwise it will not fit into region 91.

Figure 5:
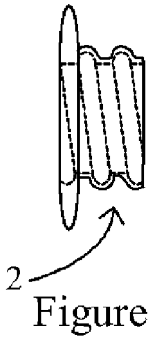
FIG. 5 illustrates a side plan view of the fitting referred to in FIG. 4.
Figure 6:
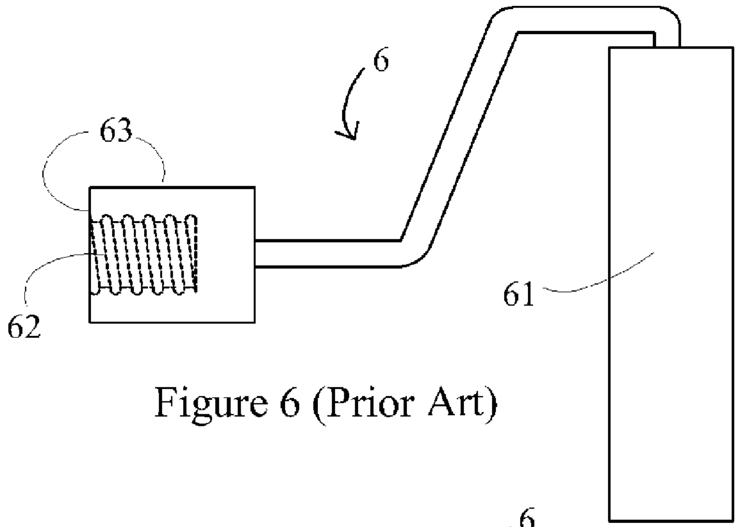
Figure 6 (Prior Art)
FIG. 6 is a side plan view illustrating a prior art tool assembly including a female receptacle configured for mating with the male-threaded handle end of the threaded utility handle of FIG. 1. The specific tool shown in FIG. 6, for example only, and not limitation, is a painting roller.

At this point, we describe the method by which universal connector apparatus 2 is used, and well as the principles of operation which emerge from the structural features of universal connector apparatus 2 as described above. For assembly, as illustrated in FIG. 3, the first step is to fit (31) universal connector apparatus 2 over the male-threaded handle end 11 of utility handle 1. This "first" fitting 31 is performed essentially by sliding universal connector apparatus 2 over male-threaded handle end 11 as illustrated, with whatever rotation along the screw threads might also be necessary to achieve a secure fit. The elasticity of universal connector apparatus 2 combined with aperture diameter 24 being approximately equal to or slightly smaller than the width of inner thread diameter 14 is used to achieve a snug fit of universal connector apparatus 2 over threaded handle end 11, as illustrated in FIG. 4. The "leading end" of universal connector apparatus 2, i.e., that end which leads when universal connector apparatus 2 is placed over threaded handle end 11, is the end which comprises friction ring 21. The "trailing end" comprises thread neck 22 As mentioned above, friction ring 21 also provides a surface which cam be gripped with the user's fingers and thumb, providing a point of firm contact which the user employs to aid in whatever sliding and rotation is needed to achieve fitting 31. Fitting 31 is finally achieved, once friction ring 21 substantially makes contact with circumferential "shoulder" 15 and thread neck 22 has moved all the way past the threads closest to the end 41 of threaded handle end 11, leaving these end 41 threads still exposed, as illustrated in FIG. 4. Thread neck 22, then covers and snugly conforms to the threads closest to circumferential "shoulder" 15, also as illustrated in FIG. 4. FIG. 5 illustrates the deformation of universal connector apparatus 2 which occurs once this fitting 31 has been achieved.

Figure 8:
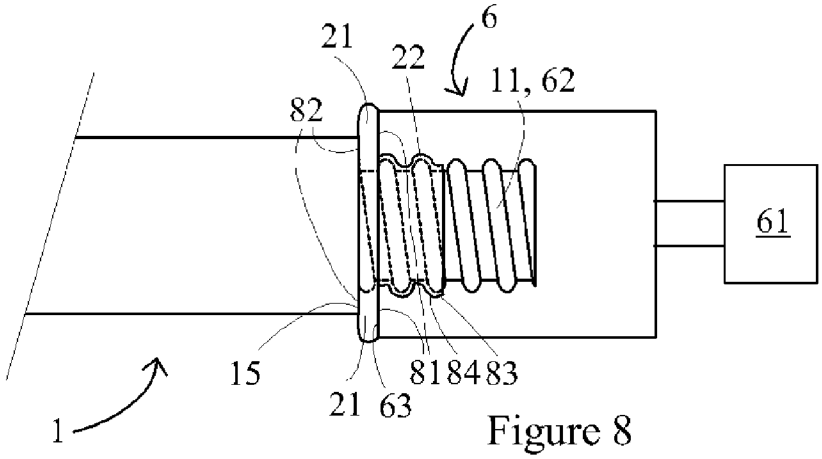
FIG. 8 is a plan view which proceeds from FIG. 7, once the entire assembly is complete. It is FIG. 8 which illustrates how the invention is used to secure the utility handle of FIG. 1 to the tool assembly exemplified by FIG. 6 following all assembly.
Figure 9:
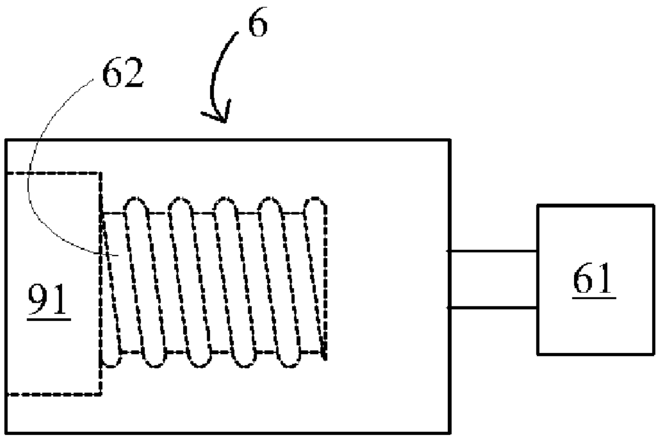
Figure 9 (Prior Art)
FIG. 9 is a plan view (with schematic tool) illustrating an alternative prior art configuration of the female receptacle in which part of the non-threaded portion of the utility handle enters the female receptacle.

The second step is to now fit (71) female receptacle 62 of tool assembly 6 over the combination illustrated in FIG. 4, of threaded handle end 11 and universal connector apparatus 2. This "second" fitting 71, illustrated in FIG. 7 and culminating in FIG. 8, entails the clockwise "screwing" of female receptacle 62 over the threaded handle end 11 in the customary manner, but with the "intervention" of universal connector apparatus 2. Because the threads closest to the end 41 of threaded handle end 11 are left exposed, when the screwing process first begins, the female threads of female receptacle 62 engage the male threads proximate end 41 in the usual manner. Then, as the screwing continues, female receptacle 62 engages over the outer surface of thread neck 22, so that thread neck 22, with its elasticity and frictional properties, contracts both threaded handle end 11 and the female threads inside female receptacle 62, providing additional friction against relative rotation. The screwing is continued until, as shown in FIG. 8, the outer surface 63 of female receptacle 62 butts firmly against friction ring 21 over a receptacle-to-ring frictional surface 81, and further pushes friction ring 21 to butt firmly against circumferential shoulder 15 of utility handle 1 over a shoulder-to-ring frictional surface 82. Essentially, friction ring 21 becomes "squeezed" between circumferential shoulder 15 and the female receptacle outer surface 63, and thereby provides a frictional impedance between circumferential shoulder 15 and outer surface 63. This screwing also yields a receptacle-to-neck frictional surface 83, and a thread-to-neck frictional surface 84, that is, friction from thread neck 22 also impedes rotation between female receptacle 62 and threaded handle end 11. These frictional surfaces 81, 82, 83, and 84 all combine to impede relative rotation between threaded handle end 11 and the female receptacle 62 of tool assembly 6. At this juncture, when tool 61 is applied to a work piece via utility handle 1, there will be no unwanted rotation between the tool and the handle. Because universal connector apparatus 2 comprises a connector material for which the friction does not degrade even when wetted, and which for wet application, preferably, gains friction (e.g., tack) when wetted, this means that unwanted rotation is avoided even during the performance of wet work.

Disassembly follows a reverse set of steps. Female receptacle 62 is first unscrewed from over threaded handle end 11 and universal connector apparatus 2 in an operation which is the inverse of FIG. 7, and then universal connector apparatus 2 is removed from over threaded handle end 11 in the operational inverse of FIG. 3.

It is preferred that universal connector apparatus 2 further comprise a connector material which is highly durable and which resists tearing and will not easily degrade under various types of chemical exposure (e.g., to paints, cleaning fluids, etc), so that universal connector apparatus 2 can be reused many times before its useful life expires. It is also important—depending on the specific intended application—that the materials not break down or substantially degrade when brought into contact, for example, with various petroleum-based, water-based, or alcohol-based products, soaps and cleaning solutions, heat, sunlight, etc. Thus, for example, an inexpensive box of perhaps a half dozen or a dozen of the universal connector apparatuses 2 can last a professional painter, cleaner, etc, for many months, and perhaps years of repeated application. In this way, universal connector apparatus 2 truly is a "universal" tool that can be applied to any application where a utility handle 1 is used to control any type of suitable tool 61, and becomes a standard stock supply item for any professional or non-professional work-person along with such items as nails, screws, tapes, elastic bands, etc.

As discussed above, the most important material properties for universal connector apparatus 2 are that it be elastic so as so ensure a snug fit over threaded handle end 11, that it provide sufficient friction to impede relative rotation between utility handle 1 and tool assembly 6 (even when wetted, and preferably with added friction when wetted), as shown particularly in connection with FIG. 8, and that it be durable against physical wear and chemical degradation. Generally, these materials will be in the broad range of elastomers and plastics including many rubber or rubberized materials. Some specific connector materials which may possess these properties and thus may be suitable for use in universal connector apparatus 2, for example and not limitation, are listed, for example, in the Journal of Elastomers and Plastics, available at http://jep.sagepub.com/, for which the January 2006, volume 38 has been provided with an information disclosure submitted at the date of filing. Further materials, by way of example not limitation, may also include: Solution Butadiene Rubber, High and Low CIS, non-oil, oil-extended and vinyl types. Cobalt, Neodymium, and Lithium catalysed grades; Polychloroprene Dry Rubber-Mercaptan, Xanthogen, and Sulfur Modified, plus Pre Crosslinked grades for both Rubber and Adhesive Applications; Ethylene Propylene Rubber EPM and EPDM non-oil and oil-extended types—A few grades available in crumb/granule form; Butyl Rubber-Regular, Specialty, and Halogenated (BIIR/CIIR) Rubber and Adhesive Types; Solution Polyisoprene/Low to High CIS content; Nitrile Rubber-Fast Curing, Low Mould Fouling, and Standard Curing Grades. Complete ACN and Mooney Ranges. Regular, Cross-linked, Carboxylated (XNBR), Powdered and Pre Crosslinked Powdered Grades, Nitrile PVC Blends; Emulsion Styrene Butadiene Rubber-Hot & Cold Types, Oil Extended, Pre Crosslinked, High Styrene Resin Masterbatches, Carbon Black Masterbatches. Solution Styrene Butadiene Rubber-Block & Vinyl grades. Vinyl grades are non-oil and oil-extended; Acrylic/Polyacrylate; Butyl (Polyisobutylene/Polybutene); Ethylene Copolymer; Fluoroelastomer; Isoprene/Polyisoprene; Polybutadiene; Polyethylene (PE); Polyolefin; Polysulphide; Polyurethane (PU, PUR); Silicone; Vinyl; Gum Rubber Compounds; Urethanes; Neoprenes; Silicones; NBR's and HNBR's; EPDM's; FKM's; and Butyl.

Figure 10:
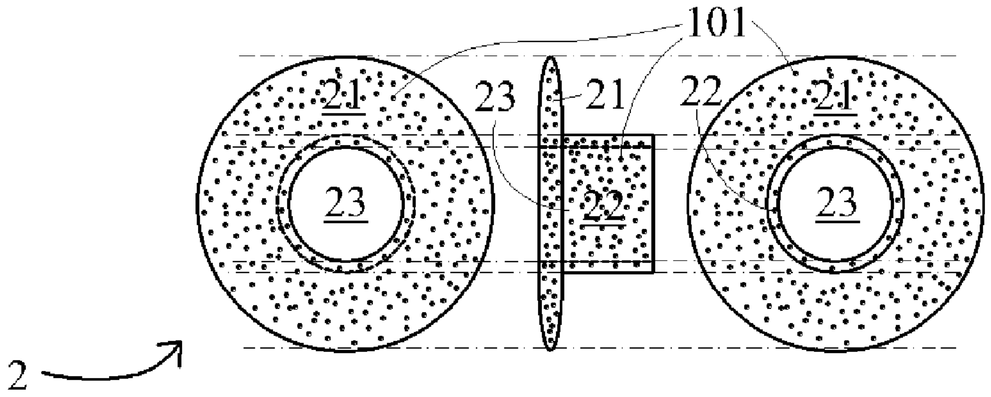
FIG. 10 is a plan view similar to FIG. 2, illustrating an invention embodiment comprising optional frictional grits.

In order to enhance the friction provided by universal connector apparatus 2 between utility handle 1 and tool assembly 6, various optional surface features may also be incorporated, separately or in combination. For example, FIG. 10 illustrates a "gritted" embodiment of universal connector apparatus 2 wherein universal connector apparatus 2 comprises a connector material comprising a plurality of frictional grits 101 which further enhance the aforementioned frictional properties of universal connector apparatus 2. While both friction ring 21 and thread neck 22 are illustrated so as to comprise these optional frictional grits 101, another envisioned embodiment is one in which only friction ring 21 comprises frictional grits 101, as well an embodiment in which only thread neck 22 comprises frictional grits 101.

While frictional grits 101 are illustrated to be part of the connector material from which universal connector apparatus 2 is fabricated (for example, these grits may be suspended in the liquefied form of the connector material before the connector material is molded and then hardened into the form of universal connector apparatus 2), it is also possible for these grits to be added after universal connector apparatus 2 is fabricated. For example, the manufacturing process may include the steps of first molding universal connector apparatus 2 into the form illustrated in FIG. 2 without any frictional grits 101, and then dipping the so-molded universal connector apparatus 2 into a strong adhesive mixed with frictional grits 101. Then, once the adhesive hardens about the surface of universal connector apparatus 2, the surface of universal connector apparatus 2 will be suitably-gritted for added friction. For the embodiments mentioned above where only the friction ring 21 is gritted, or where only the thread neck 22 is gritted, this may be a preferred method of manufacture. This is because it may be more difficult and costly to mold a unitary universal connector apparatus 2 from two different connector materials, one gritted and one not, than to simply mold universal connector apparatus 2 as a unitary module without gritting 101, as in FIG. 2, and then apply the gritted adhesive to only a controlled part of universal connector apparatus 2 (e.g., only to friction ring 21 or only to thread neck 22).

Figure 11:
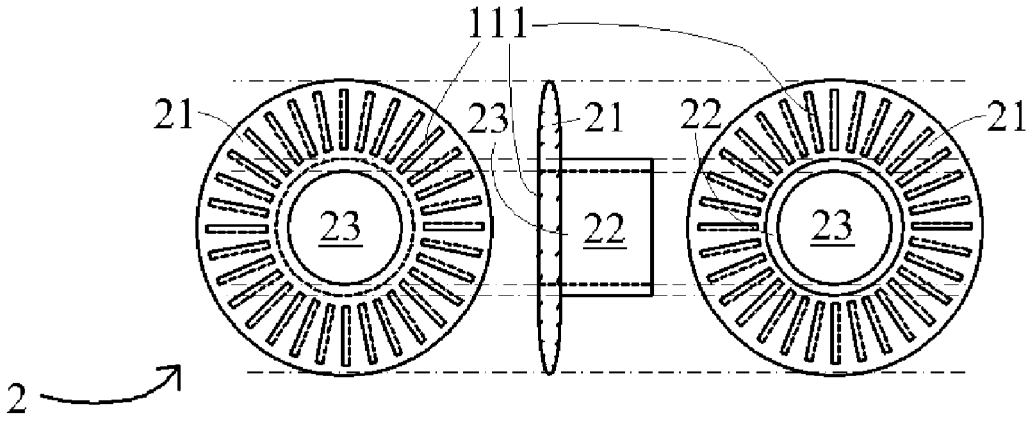
FIGS. 11 and 12 are plan views similar to FIG. 2, illustrating an invention embodiment comprising optional frictional surface features.
Figure 12:
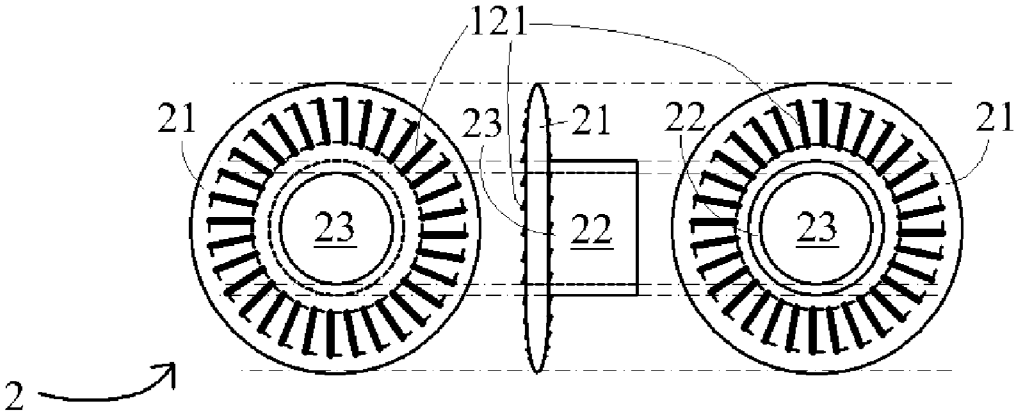
Figure 13:
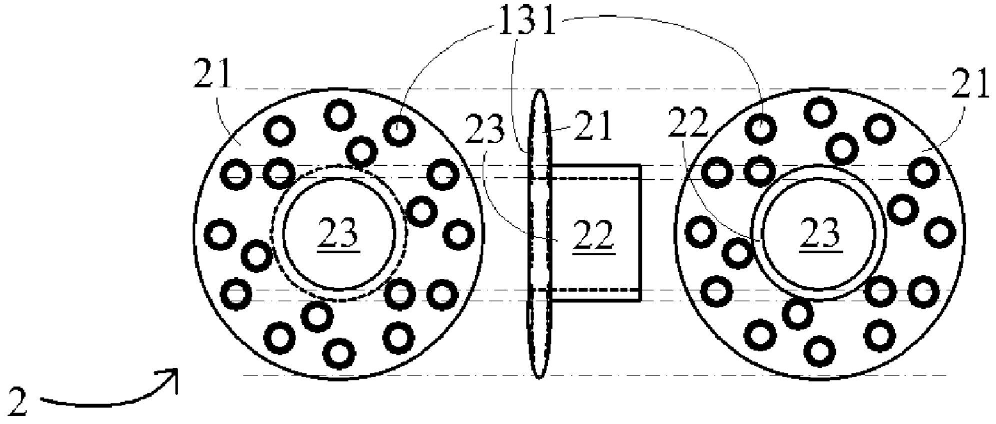
FIG. 13 is a plan view similar to FIG. 2, illustrating an invention embodiment where optional frictional surface features include suction cups which create a vacuum to enhance friction.

FIGS. 11 through 13 illustrate three different embodiments of optional surface features 111, 121, 131 which add further friction to impede relative rotation between utility handle 1 and tool assembly 6. These three embodiments of surface features 111, 121, 131 are for example only, not limitation.

The exemplary, non-limiting surface features 111 illustrated in FIG. 11, comprise a plurality of cuts in the surface of friction ring 21, slanted in particular to impede the relative counterclockwise rotation which would cause utility handle 1 and tool assembly 6 to loosen their connection. The solid lines on 111 in FIG. 11 show the cuts right at the surface, while the hidden lines illustrate the cuts beneath the visible surface. The side plan view diagram of FIG. 11 also shows the slanting of the cuts to as to impede loosening. It will be apparent that when the universal connector apparatus 2 of FIG. 11 is connected between utility handle 1 and tool assembly 6 as in FIG. 8, that these surface features 111 will in fact provide an asymmetric frictional impedance, resisting counterclockwise (disconnection-direction) rotation more-so than clockwise (connection-direction) rotation.

The exemplary, non-limiting surface features 121 illustrated in FIG. 12, comprise a plurality of raised ribs disposed on the surface of friction ring 21. The thickened lines in the leading and trailing-edge views illustrate the part of each rib that is raised most prominently above the surface. This can also be seen from the corresponding side plan view of FIG. 12. Here too, it is apparent that this asymmetric configuration of ribs similarly resists counterclockwise rotation more-so than clockwise rotation. While this drawing illustrates elongated ribs, the shape of these raised surface features may readily be varied in any one of a variety of ways all of which would be obvious to one of ordinary skill and fall within the scope of this disclosure and its associated claims. Circles, ovals, polygons, or other shapes which provide surface contour similarly to the rib surface features 121, are all considered to be within the scope of this disclosure and its associated claims. The shape is less important than the fact that the surface features tend to enhance the frictional impedance, especially in the counterclockwise direction.

The exemplary, non-limiting surface features 131 illustrated in FIG. 13, comprise a plurality of suction cups disposed on the surface of friction ring 21. These suction cups operate in the usual manner, by creating a vacuum when pressed against an adjoining surface. In particular, when the embodiment of friction ring 21 illustrated in FIG. 13 is seated as in FIG. 8 and the screw threads 11 are tightened into female receptacle 62, the air is squeezed out of each of the suction cup surface features 131 illustrated in FIG. 13, providing further rotational impedance. Because the vacuum created by a suction cup in contact with a surface is actually strengthened when the point of contact is wetted, this particular embodiment actually provides a higher rotational impedance for wet applications than for dry ones. Optionally combined with using a material which becomes tacky when wetted, one can attain a very firm fitting for all wet application.

It is understood, again, that FIGS. 11-13 are merely examples of surface features which can introduce further rotational impedance, are non-limiting, and that variations in a manner which would be apparent to someone of ordinary skill in the art are regarded to be within the scope of this disclosure and its associated claims. It is to be understood that FIGS. 11-13 can also be combined as desired, with or without the gritting of FIG. 10, so combinations of surface features in FIGS. 11-13, or combinations of apparent variations of FIGS. 11-13, with or without gritting, are also regarded to be within the scope of this disclosure and its associated claims.

Throughout the disclosure, the primary preferred embodiment illustrated and discussed has been that of FIG. 2, wherein universal connector apparatus 2 comprises both friction ring 21 and thread neck 22, in combination. The advantages of integrally combining both of these elements have been fully described, and include the creation of enhanced frictional surfaces both along the threading, and between threaded utility handle 1 and tool 61, as well as the extra grip provided by friction ring 21, see FIG. 8 and the associated earlier discussion. Other enhancements such as those of FIGS. 10 through 13 all make use of the same base embodiment of FIG. 2, with the friction ring 21 and thread neck 22 combination.

Figure 14:
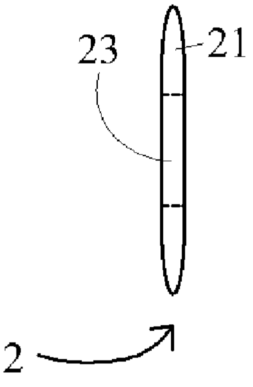
FIGS. 14 and 15 illustrate a side plan view of a universal connector apparatus in additional invention embodiments.
Figure 15:
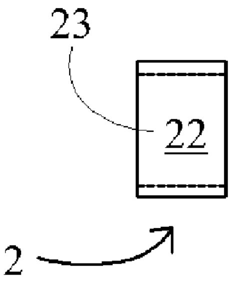

While less preferred, one might also employ embodiments with only friction ring 21, as is illustrated in FIG. 14, or with only thread neck 22, as is illustrated in FIG. 15. With the FIG. 14 embodiment, however, one loses the extra friction along the threading. Similarly, with the FIG. 15 embodiment, one loses the extra friction between threaded utility handle 1 and tool 61, as well as the extra "grip" for attachment and detachment which is provided by friction ring 21. Although these embodiments are less preferred, it is to be understood that these embodiments are nevertheless considered to be within the scope of this disclosure and any associated claims.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A universal connector apparatus for securing a male-threaded utility handle into a female-threaded receptacle of a tool assembly comprising a tool, the connector apparatus comprising:

a substantially-circular friction ring comprising opposing contact surfaces;

a substantially-circular thread neck unitarily formed with and longitudinally-aligned with, at a leading end thereof, a trailing end of said friction ring; and a substantially-circular threaded-end aperture comprising an aperture diameter and longitudinally extending through the friction ring and thread neck combination such that said threaded-end aperture is open at both ends thereof;

said friction ring oriented in a plane substantially perpendicular to a centerline longitudinally extending through said threaded-end aperture, and substantially wider in said perpendicular plane than in a direction parallel to said centerline, each of said opposing contact surfaces of said friction ring comprising friction-enhancing surface features;

said threaded-end aperture being sized and shaped to and said friction ring and said thread neck comprising an elastic connector material which radially elastically deforms to conform to male threads of the male-threaded handle having an outer thread diameter larger than said aperture diameter when an end of the handle proximate the male threads is inserted into said threaded-end aperture and extends through said friction ring and thread neck combination;

wherein said connector material is selected from the friction-enhancing materials group consisting of elastomers and plastics; and said connector material with said friction-enhancing surface features supplying enhanced friction wherein when said friction ring and thread neck combination is fitted over the male threads, and when the male threads in combination with said thread neck are screwed into the female-threaded receptacle of the tool assembly, said connector apparatus substantially impedes relative rotation between the handle and the tool, said friction-enhancing surface features adding friction between a circumferential shoulder of said utility handle and an outside surface of said female-threaded receptacle.

2. The apparatus of claim 1, wherein when the male threads in combination with said thread neck are screwed into the female-threaded receptacle of the tool, said relative rotation is impeded by said thread neck adding friction between the male threads and female-threaded threads inside of said female receptacle.

3. The apparatus of claim 1, said connector apparatus comprising a connector length between approximately ¼" and ¾".

4. The apparatus of claim 1, said connector material comprising a material for which said friction is increased when said connector material is wetted.

5. The apparatus of claim 1, said connector material in addition to the friction-enhancing properties of said elastomers and plastics, comprising frictional grits for increasing said friction.

6. The apparatus of claim 1, said surface features asymmetrically impeding disconnection-direction rotation over connection-direction rotation.

7. The apparatus of claim 1, said surface features in addition to the friction-enhancing properties of said elastomers and plastics, comprising a plurality of suction cups creating a suction vacuum for enhancing the rotational impedance.

8. The apparatus of claim 1, said friction-enhancing surface features, in addition to the friction-enhancing properties of said elastomers and plastics, comprising one of a plurality of cuts and a plurality of raised ribs.

9. A method for securing a male-threaded utility handle into a female-threaded receptacle of a tool assembly comprising a tool, using a universal connector apparatus, the method comprising:

inserting the handle proximate the male threads through a friction ring and thread neck combination of said universal connector apparatus and fitting said friction ring and said thread neck over the male threads of the male-threaded handle, wherein:

said friction ring is substantially-circular and comprises opposing contact surfaces;

said thread neck is substantially-circular and is unitarily formed with and longitudinally-aligned with, at a leading end thereof, a trailing end of said friction ring;

a substantially-circular threaded-end aperture comprising an aperture diameter smaller than an outer diameter of said male threads longitudinally extends through the friction ring and thread neck combination such that said threaded-end aperture is open at both ends thereof;

said friction ring is oriented in a plane substantially perpendicular to a centerline longitudinally extending through said threaded-end aperture, and substantially wider in said perpendicular plane than in a direction parallel to said centerline, each of said opposing contact surfaces of said friction ring comprising friction-enhancing surface features;

said threaded-end aperture is sized and shaped to and said friction ring and said thread neck comprise an elastic connector material which radially elastically deforms to conform to the male threads of the male-threaded handle; and said connector material is selected from the friction-enhancing materials group consisting of elastomers and plastics; and screwing the male threads in combination with said thread neck into the female-threaded receptacle of the tool assembly, such that said connector apparatus substantially impedes relative rotation between the handle and the tool, by supplying enhanced friction using said connector material with said friction-enhancing surface features, said friction-enhancing surface features adding friction between a circumferential shoulder of said utility handle and an outside surface of said female-threaded receptacle.

10. The method of claim 9, further comprising impeding said relative rotation by said thread neck adding friction between the male threads and female threads inside of said female-threaded receptacle when the male threads in combination with said female-threaded neck are screwed into the female receptacle of the tool.

11. The method of claim 9, said connector apparatus comprising a connector length between approximately ¼" and ¾".

12. The method of claim 9, said connector material comprising a material for which said friction is increased when said connector material is wetted.

13. The method of claim 9, said connector material in addition to the friction-enhancing properties of said elastomers and plastics, comprising frictional grits increasing said friction.

14. The method of claim 9, said surface features in addition to the friction-enhancing properties of said elastomers and plastics, comprising a plurality of suction cups asymmetrically impeding disconnection-direction rotation over connection-direction rotation.

15. The method of claim 9, said surface features creating a suction vacuum enhancing the rotational impedance.

16. The method of claim 9, said friction-enhancing surface features, in addition to the friction-enhancing properties of said elastomers and plastics, comprising one of a plurality of cuts and a plurality of raised ribs.

* * * * *

UNITED STATES PATENT AND TRADEMARK OFFICE

CERTIFICATE OF CORRECTION

PATENT NO. : 7,686,531 B2
APPLICATION NO. : 11/691616
DATED : March 30, 2010
INVENTOR(S) : Joseph L. Congdon It is certified that error appears in the above-identified patent and that said Letters Patent is hereby corrected as shown below:

As corrected, these claims read as follows:

5. The apparatus of claim 1, said connector material, in addition to the friction-enhancing properties of said elastomers and plastics, comprising frictional grits for increasing said friction.

7. The napparatus of claim 1, said surface features, in addition to the friction-enhancing properties of said elastomers and plastics, comprising a plurality of suction cups creating a suction vacuum for enhancing the rotational impedance.

13. The method of claim 9, said connector material, in addition to the friction-enhancing properties of said elastomers and plastics, comprising frictional grits increasing said friction.

14. The method of claim 9, said surface features, in addition to the friction-enhancing properties of said elastomers and plastics, comprising a plurality of suction cups asymmetrically impeding disconnection-direction rotation over connection-direction rotation.

Signed and Sealed this

Fourth Day of May, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,686,531 B2
APPLICATION NO. : 11/691616
DATED : March 30, 2010
INVENTOR(S) : Joseph L. Congdon It is certified that error appears in the above-identified patent and that said Letters Patent is hereby corrected as shown below:

As corrected, these claims read as follows:

Column 10, lines 41-44, claim 5 should read,
5. The apparatus of claim 1, said connector material, in addition to the friction-enhancing properties of said elastomers and plastics, comprising frictional grits for increasing said friction.

Column 10, lines 49-52, claim 7 should read,
7. The napparatus of claim 1, said surface features, in addition to the friction-enhancing properties of said elastomers and plastics, comprising a plurality of suction cups creating a suction vacuum for enhancing the rotational impedance.

Column 12, lines 16-19, claim 13 should read,
13. The method of claim 9, said connector material, in addition to the friction-enhancing properties of said elastomers and plastics, comprising frictional grits increasing said friction.

Column 12, lines 20-24, claim 14 should read,
14. The method of claim 9, said surface features, in addition to the friction-enhancing properties of said elastomers and plastics, comprising a plurality of suction cups asymmetrically impeding disconnection-direction rotation over connection-direction rotation.

This certificate supersedes the Certificate of Correction issued May 4, 2010.

Signed and Sealed this

First Day of June, 2010

David J. Kappos

*Director of the United States Patent and Trademark Office*